US009230121B1

(12) United States Patent
Kelley et al.

(10) Patent No.: US 9,230,121 B1
(45) Date of Patent: Jan. 5, 2016

(54) TECHNIQUES FOR PERSISTENTLY TOGGLING A FIPS-140 CRYPTOGRAPHIC MODE OF A CLUSTERED STORAGE SYSTEM

(71) Applicant: EMC Corporation, Hopkinton, MA (US)

(72) Inventors: Benjamin P. Kelley, Worcester, MA (US); Mahadevan Vasudevan, Ashland, MA (US); Millard C. Taylor, II, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 45 days.

(21) Appl. No.: 14/144,835

(22) Filed: Dec. 31, 2013

(51) Int. Cl.
*G06F 21/60* (2013.01)

(52) U.S. Cl.
CPC .................................... *G06F 21/602* (2013.01)

(58) Field of Classification Search
CPC ..................................................... G06F 21/602
USPC ........................................................... 713/189
See application file for complete search history.

(56) References Cited

U.S. PATENT DOCUMENTS

| | | | |
|---|---|---|---|
| 4,451,884 A * | 5/1984 | Heath et al. | 710/24 |
| 7,394,761 B2 * | 7/2008 | Foster et al. | 370/227 |
| 8,707,050 B1 * | 4/2014 | Robinson et al. | 713/187 |
| 2004/0130919 A1 * | 7/2004 | Sullivan et al. | 363/49 |

* cited by examiner

*Primary Examiner* — Dao Ho
(74) *Attorney, Agent, or Firm* — BainwoodHuang

(57) ABSTRACT

Improved clustered storage systems make use of a software toggle switch stored in a shared persistent configuration database, which allows a peer node to be rebooted into a FIPS 140 mode defined by the switch and then to take over as master while the original master node reboots into the new FIPS 140 mode as defined by the switch. Advantageously, system availability is maintained as the nodes are rebooted sequentially while a master is always available. The persistent switch allows for synchronization, while also allowing persistence of state even in the event of a system crash.

9 Claims, 3 Drawing Sheets

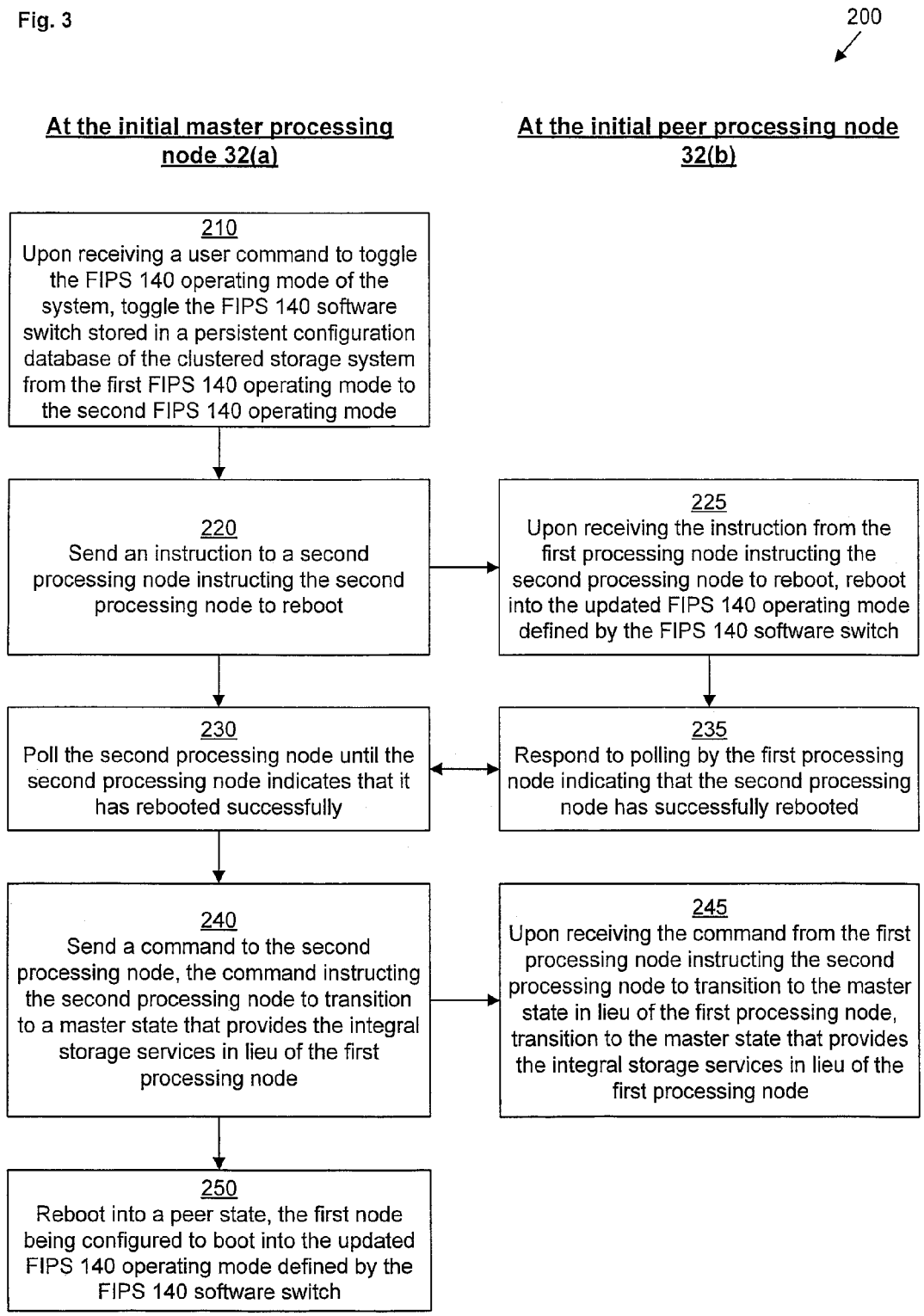

TECHNIQUES FOR PERSISTENTLY TOGGLING A FIPS-140 CRYPTOGRAPHIC MODE OF A CLUSTERED STORAGE SYSTEM

BACKGROUND

Cryptography is an important feature of modern computing systems, as it allows communication to occur without fear of eavesdropping. However, there are various degrees of cryptography, some of which are more robust and reliable than others. The Federal government has established certain standards regarding acceptable cryptographic algorithms. The National Institute of Standards and Technology has circulated the Federal Information Processing Standard (FIPS) Publications 140-1 and 140-2 (generally, FIPS 140) to promulgate these standards.

The FIPS 140-2 standard establishes a Cryptographic Module Validation Program to validate that particular cryptographic modules are accredited as being in compliance with FIPS 140-2 standards. Conventional management applications that implement the Cryptographic Module Validation Program, only permits certain cryptographic methods to be used for sensitive information to the exclusion of less robust cryptographic methods. Both hardware and software modules can be validated to be FIPS 140-2 compliant.

SUMMARY

Unfortunately, the above-described conventional management applications may suffer from deficiencies. For example, although FIPS 140-2 validated cryptographic modules provide a certain degree of assurance of cryptographic reliability, there may be situations in which FIPS 140-2 compliance may be burdensome. A FIPS 140 cryptographic module will not be able to exchange sensitive information with a legacy client that is not capable of using any of the FIPS 140 cryptographic methods, for example. Thus, users may wish to be able to selectively operate computing devices either in a FIPS 140 compliant mode or not. Some systems allow FIPS 140 compliance to be operative in an ON mode but not in an OFF mode. However, due to the nature of the FIPS 140 standards (e.g., certain checks must be performed at startup), a computing device typically must be rebooted in order to toggle between these modes. Unfortunately, this requirement makes it difficult to keep synchronization of FIPS 140 mode in a clustered system having several computing nodes each running a FIPS 140 compatible cryptographic module. In addition, the rebooting requirement makes it difficult to maintain a high state of system availability (which may be important in an Enterprise class data storage system) when toggling of the FIPS 140 mode is performed frequently.

In order to alleviate these problems, it would be desirable to implement a clustered storage system with synchronization capabilities that also allow high availability to be maintained even when reboots are required to toggle FIPS 140 modes. Thus, in contrast to the above-described approaches, improved clustered storage systems make use of a software toggle switch stored in a shared persistent configuration database. This software toggle switch allows a peer node to reboot into a FIPS 140 mode defined by the switch. Once rebooted, this peer node then takes over as the master while the original master node reboots into the new FIPS 140 mode as defined by the switch.

Advantageously, system availability is maintained as the nodes are rebooted sequentially while a master is always available. The persistent switch allows for synchronization, while also allowing persistence of state even in the event of a system crash.

One embodiment of the improved techniques is directed to a method of operating a clustered storage system to toggle from a first cryptographic operating mode to a second cryptographic operating mode in a highly-available manner. The method includes (a) toggling a cryptographic mode software switch stored in a persistent configuration database of the clustered storage system from the first cryptographic operating mode to the second cryptographic operating mode, (b) at a first node of the clustered storage system, sending an instruction to a second node instructing the second node to reboot, the second node being configured to boot into a cryptographic operating mode defined by the cryptographic mode software switch, the first node initially being in a master state that provides integral storage services and the second node initially being in a peer state, (c) at the first node, polling the second node until the second node indicates that it has rebooted successfully, (d) upon the second node having rebooted, sending a command from the first node to the second node, the command instructing the second node to switch to the master state that provides the integral storage services, and (e) rebooting the first node into the peer state, the first node being configured to boot into the cryptographic operating mode defined by the cryptographic mode software switch.

A system and apparatus for performing the method are also provided. As an example, the system includes (1) a persistent configuration database storing a cryptographic mode software switch, the cryptographic mode software switch initially being in an initial state, the initial state defining an initial cryptographic operating mode of the system, (2) a first processing node initially in a master state that provides integral storage services, the first processing node operating in the initial cryptographic operating mode defined by the initial state of the cryptographic mode software switch, and (3) a second processing node initially in a peer state, the second processing node operating in the initial cryptographic operating mode defined by the initial state of the cryptographic mode software switch. The first processing node is configured to (a) upon receiving a user command to toggle the cryptographic operating mode of the system, toggle the cryptographic mode software switch stored in the persistent configuration database from the initial cryptographic operating mode to an updated cryptographic operating mode, (b) subsequently, send an instruction to the second processing node instructing the second processing node to reboot, (c) poll the second processing node until the second processing node indicates that it has rebooted successfully, (d) subsequently, send a command to the second processing node instructing the second processing node to transition to the master state that provides the integral storage services in lieu of the first processing node, and (e) subsequently reboot into the peer state, the first processing node being configured to boot into the updated cryptographic operating mode defined by the cryptographic mode software switch. The second processing node is configured to: (A) upon receiving the instruction from the first processing node instructing the second processing node to reboot, reboot into the updated cryptographic operating mode defined by the cryptographic mode software switch, (B) upon rebooting, respond to polling by the first processing node indicating that the second processing node has successfully rebooted, and (C) upon receiving the command from the first processing node instructing the second processing node to transition to the master state in lieu of the first processing node, transition to the master state that provides the integral storage services in lieu of the first processing node.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example method according to various embodiments.

DETAILED DESCRIPTION

Embodiments are directed to improved clustered storage systems making use of a software toggle switch stored in a shared persistent configuration database, which allows a peer node to be rebooted into a FIPS 140 mode defined by the switch and then to take over as master while the original master node reboots into the new FIPS 140 mode as defined by the switch. Advantageously, system availability is maintained as the nodes are rebooted sequentially while a master is always available. The persistent switch allows for synchronization, while also allowing persistence of state even in the event of a system crash.

Figure 1:
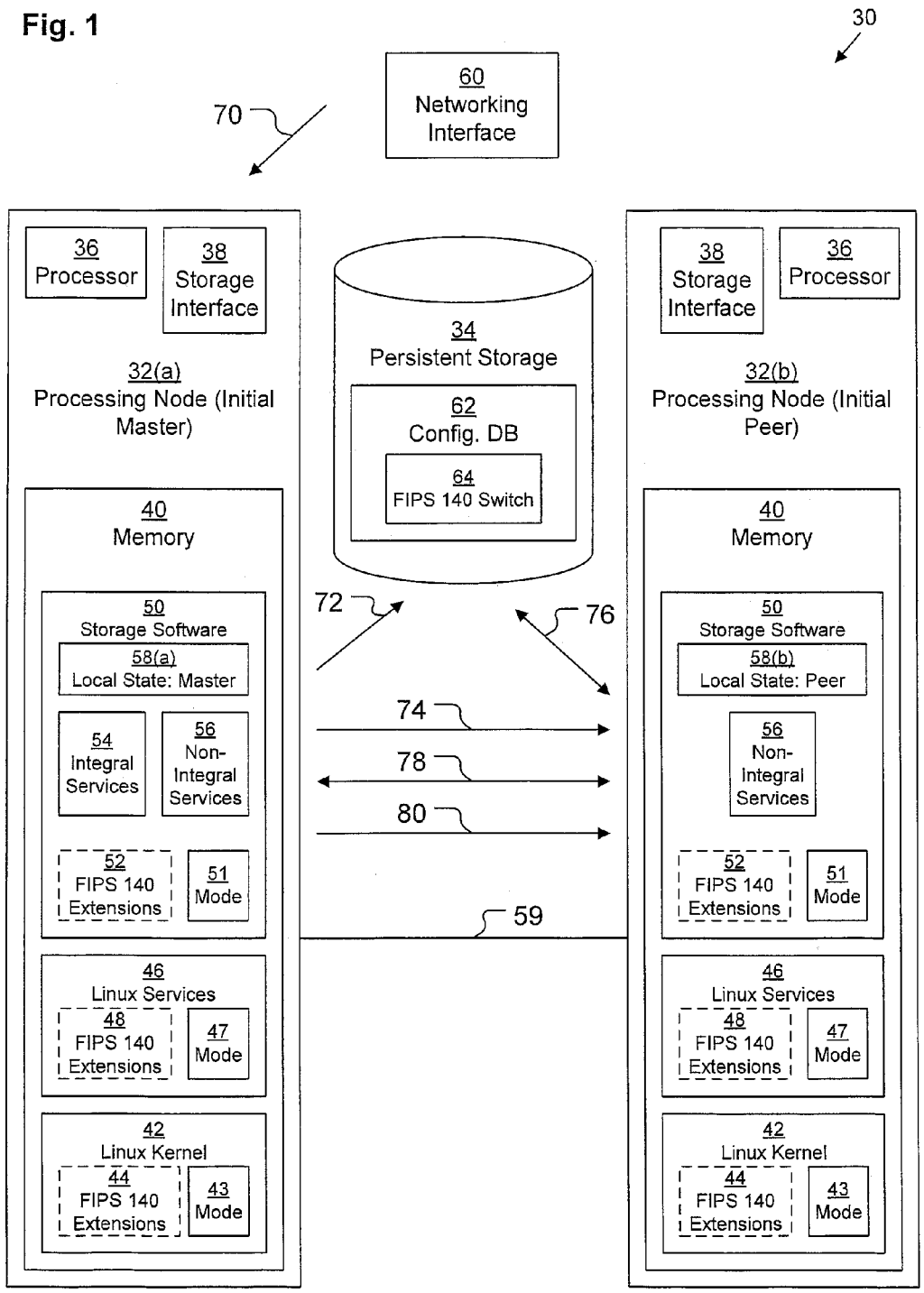
FIG. 1 depicts an example system according to various embodiments.

FIG. 1 depicts an example system 30. System 30 includes a plurality of clustered processing nodes 32, persistent storage 34, and networking interface circuitry 60. Although depicted as a system, in some embodiments, system 30 may instead be realized as a unified apparatus enclosed within a common housing. Thus, system 30 may be a realized using a high performance data storage array, such as, for example a VNXe Series data storage system produced by the EMC Corp. of Hopkinton, Mass.

Network interface circuitry 60 may include an Ethernet card, a fiber channel interface, a cellular modem, a Wireless Fidelity (WiFi) wireless networking adapter, any other device for connecting to a network, or some combination thereof. Network interface circuitry 60 connects to a network, including any kind of data communication network, such as for example the Internet, a local area network (LAN), a wide area network (WAN), a storage area network (SAN), a virtual private network (VPN), a cellular data network, a wireless local area network, an interconnected fabric of connections and switches, similar systems, and combinations thereof.

Persistent storage 34 may include a set of persistent data storage devices (e.g., hard disk drives, solid state storage drives, etc.) on which data may be persistently stored. In a typical embodiment, the storage drives are arranged in one or more array configurations as one or more RAID arrays for providing a set of storage volumes (not depicted). In addition to storage volumes, persistent storage 34 also includes a configuration database 62 which persistently stores configuration details for the system 30. On such configuration detail is a FIPS 140 toggle switch 64, which stores the currently-assigned FIPS 140 state of the system 30.

As depicted, there are two processing nodes 32(a), 32(b) in a clustered configuration. First processing node 32(a) is an initial master node, while second processing node 32(b) is an initial peer node.

Each processing node 32 may be any kind of computing device capable of being configured in a cluster arrangement. However, in a typical embodiment, each processing node is a storage processor of a data storage array. Thus, each processing node 32 is housed on a board that plugs into a connective backplane of the data storage array.

Each processing node 32 includes a processor 36, storage interface circuitry 38, and memory 40. An inter-node communications link 59 communicatively connects the nodes 32 together.

Processor 36 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 38 is configured to interface the processor 36 (and memory 40) with persistent storage 34. For example, storage interface circuitry 38 may include a SCSI controller and a set of Fiber Channel bus connectors.

Memory 40 may be any kind of digital system memory, such as, for example, random access memory (RAM). Memory 40 stores an operating system (OS) program (e.g., Linux, UNIX, Windows, or a similar operating system) and applications executing on processor 36 as well as data used by those programs. Applications, when stored in non-transitory form in memory 40 or on a persistent form of storage (e.g., persistent storage 34), form a computer program product. The processor 36 running one or more of these applications thus forms a specialized circuit constructed and arranged to carry out the various processes described herein.

In a typical arrangement, as depicted, the OS is the Linux OS. Linux kernel 42 executes on processor 36 and is stored within memory 40. Running on top of the Linux kernel 42, on processor 36 in user space of memory 40, are Linux services 46. Also running within user space of memory 40 on processor 36 is storage software 50, which may make system calls to the Linux kernel 42 as well as library calls to the Linux services 46.

The Linux distribution making up the Linux kernel 42 and the Linux services 46 has FIPS 140 certification when used in conjunction with FIPS 140 compatible hardware. One example Linux distribution with FIPS 140 certification is SUSE Linux by Novell. It should be understood that, throughout this Specification, when the term "FIPS 140" is used, it refers primarily to FIPS 140-2, but, in some embodiments, FIPS 140-1 or the forthcoming FIPS 140-3 (currently in draft form) may be used instead. The various FIPS 140 standards are published by the National Institute of Standards and Technology, available online at the website h_t_t_p://csrc.nist-.gov/publications/PubsFIPS.html. The FIPS 140-1, FIPS 140-2, and FIPS 140-3 standards publications are hereby incorporated herein by this reference in their entirety. The annexes to the FIPS 140-2 and FIPS 140-3 standards are also hereby incorporated herein by this reference in their entirety.

Linux kernel 42 may include FIPS 140 extensions 44, which are system calls that are implemented in FIPS 140 safe ways. Linux kernel 43 also contains a mode flag 43, which temporarily stores (in volatile memory) a value that indicates whether the Linux kernel 42 is operating in a FIPS 140-compliant mode using FIPS 140 extensions 44 or not.

Linux services 46 may include FIPS 140 extensions 48, which are library functions that are implemented in FIPS 140 safe ways. For example, FIPS 140 extensions 148 may include a FIPS 140 compliant SSH client and FIPS 140 compliant key management services. Linux services 46 also contains a mode flag 47, which temporarily stores (in volatile memory) a value that indicates whether the Linux services 47 are operating in a FIPS 140-compliant mode using FIPS 140 extensions 48 or not.

Storage software 50 is a form of Enterprise-class storage control software which controls operation of data storage services on disks of persistent storage 34, including storage driver operation and system management functions. Storage software 50 may be, for example, the Unisphere™ unified storage management software provided by the EMC Corp. of Hopkinton, Mass. The storage software 50 is responsible for providing block-based and file-based access to the disks of persistent storage 34 and for allocating and partitioning partitions, as well as for managing RAID and other storage services, such as caching. Storage software 50 processes storage requests from host machines that come in from network interface circuitry 60.

Storage software 50 may include FIPS 140 extensions 52, which are applications that are implemented in FIPS 140 safe ways. For example, FIPS 140 extensions 52 may include a secure communications module for communicating sensitive data with remote hosts in an encrypted format by making calls to, for example, FIPS 140 compliant SSH client of FIPS 140 extensions 48 of Linux services 46. Storage software 50 also contains a mode flag 51 which temporarily stores (in volatile memory) a value that indicates whether the storage software 50 is operating in a FIPS 140-compliant mode using FIPS 140 extensions 52 or not.

Storage software 50 also includes a local state flag 58, which indicates whether the particular processing node 32 is operating as a master or as a peer. First processing node 32(a) has first state flag 58(a), and second processing node 32(b) has second state flag 58(b). In the initial state depicted in FIG. 1, in which first processing node 32(a) is initially a master node and second processing node 32(b) is initially a peer node, first state flag 58(a) initially indicates Master, while second state flag 58(b) initially indicates Peer.

By definition, when a processing node 32 is operating as a Master (e.g., initially node 32(a)), its storage software 50 executes both integral services 54 and non-integral services 56. However, when a processing node 32 is operating as a Peer (e.g., initially node 32(b)), its storage software 50 executes non-integral services 56 and not integral services 54. An example integral service 54 is the processing of a write operation to persistent storage 34. Another example integral service 54 is the creation of a new LUN within persistent storage 34. An example non-integral service is the processing of a read operation from persistent storage 34. Non-integral services 56 are typically nullipotent, so they may be performed by either a master or a peer or both simultaneously. However, integral services 54 are non-nullipotent, so it is important that two conflicting non-nullipotent commands be processed sequentially, and thus all are performed only by the master.

In operation, a user may send a FIPS 140 mode toggle request 70 to initial master node 32(a) via network interface 60. Initial master node 32(a) processes toggle request 70 by first sending a toggle command 72 to persistent storage, to flip the FIPS 140 switch 64 to persist the mode change. Initial master node 32(a) also sends a reboot command 74 to initial peer node 32(b) over inter-node communications link 59. As initial peer node 32(b) reboots, it requests and receives 76 the value of the FIPS 140 switch 64 from the persistent configuration database 62. This value tells the initial peer node 32(b) which FIPS 140 mode (e.g., ON or OFF) to boot up into. After instructing the initial peer node 32(b) to reboot, initial master node 32(a) periodically polls 78 initial peer node 32(b) to discover when initial peer node 32(b) has completed rebooting. Upon completion of the reboot, initial master node 32(a) sends a master transition command 80 to initial peer node 32(b). Subsequently, initial peer node 32(b) transitions into a master state (e.g., local state flag 58(b) switches to Master and integral services 54 are loaded on the initial peer node 32(b)), while initial master node 32(a) transitions into a peer state (e.g., local state flag 58(a) switches to Peer and integral services 54 are terminated on the initial master node 32(a)) and reboots into a FIPS 140 mode as defined by the FIPS 140 switch 64.

It should be understood that, although only two processing nodes 32(a), 32(b) are depicted, that is by way of example only. In some embodiments, additional processing nodes 32 may be clustered within system 30, such as, for example, in configurations of four or eight nodes 32. In such embodiments, only one node 32 will be a master, while the rest are peers.

Figure 2:
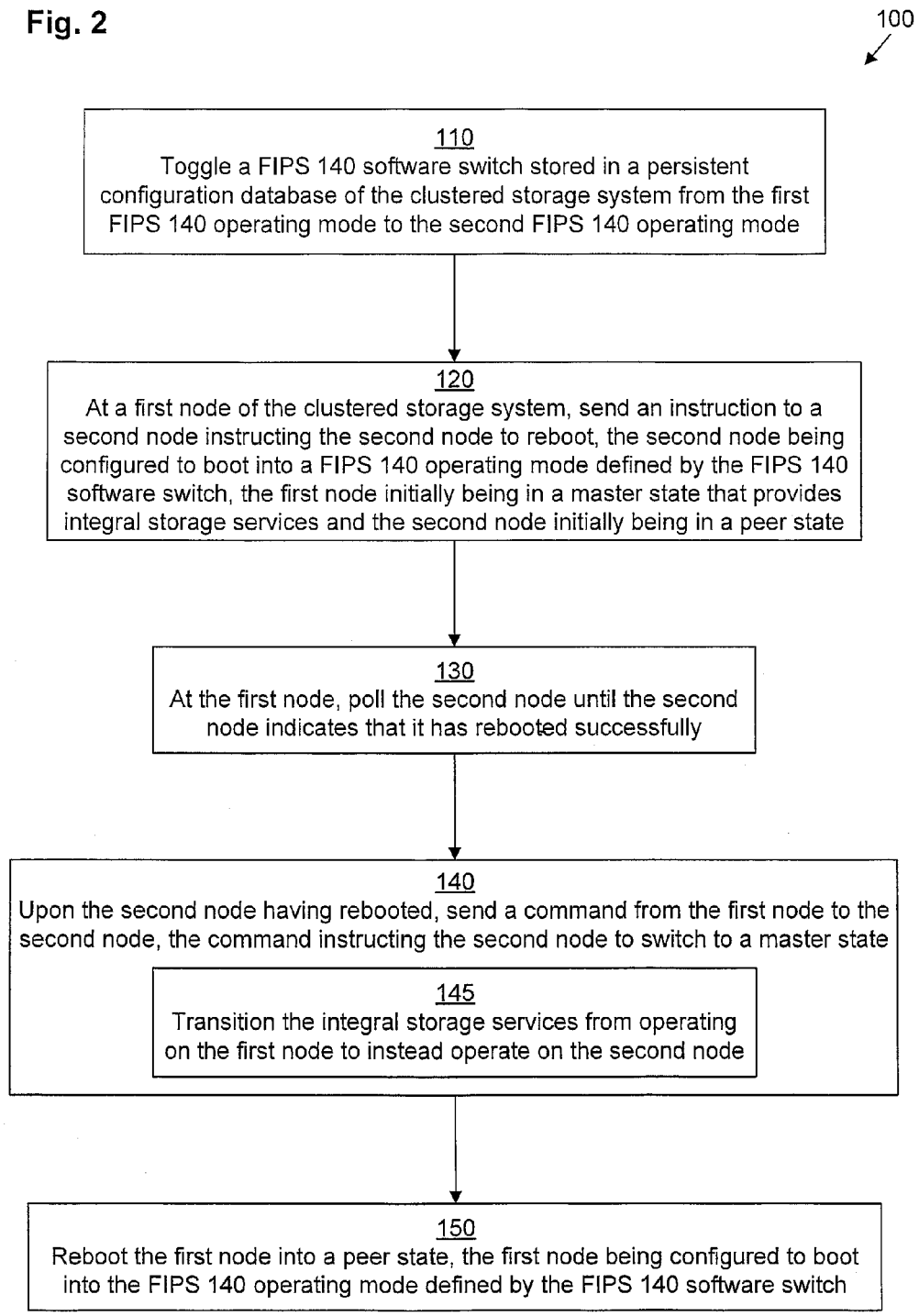
FIG. 2 depicts an example method according to various embodiments.

FIG. 2 depicts an example method 100 performed by an initial master node 32(a) in order to toggle the FIPS 140 status of system 30 in a highly-available manner in accordance with various embodiments. It should be understood that any time a piece of software, such as, for example, storage software 50, Linux services 46, or Linux kernel 42, is described as performing a method, process, step, or function, in actuality what is meant is that a computing device (e.g., processing node 32) on which that piece of software is running performs the method, process, step, or function when executing that piece of software on its processor 36.

In some embodiments, method 100 may be performed in response to a user sending FIPS 140 mode toggle request 70 to initial master node 32(a) via network interface 60 in order to toggle the FIPS 140 switch 64 from one cryptographic operating mode to another (e.g., from FIPS 140 OFF to FIPS 140 ON).

In step 110, storage software 50 of initial master node 32(a) sends toggle command 72 to persistent storage 34 to toggle the FIPS 140 switch 64 from a first cryptographic operating mode (e.g., FIPS 140 OFF) to a second cryptographic operating mode (e.g., FIPS 140 ON). Although this step is typically performed by storage software 50 of initial master node 32(a), in some embodiments, it may be performed by another component of system 30, such as a different piece of software of the initial master node 32(a) or by a different node 32. However, for security reasons, in most embodiments, only a node 32 is permitted to modify the configuration database 62 in general, and the FIPS 140 switch 64 in particular.

In step 120, storage software 50 of initial master node 32(a) sends reboot instruction 74 to another node (e.g., initial peer node 32(b)) via inter-node communications link 59 instructing the initial peer node 32(b) to reboot. Since step 110 has already been performed, when the initial peer node 32(b) begins to reboot, it will automatically boot up into the second cryptographic operating mode (e.g., FIPS 140 ON) because of the value of FIPS 140 switch 64. Thus, mode flags 43, 47, and 51 of initial peer node 32(b) will be set to the first cryptographic operating mode (e.g., FIPS 140 OFF) prior to rebooting but to the second cryptographic operating mode (e.g., FIPS 140 ON) just after rebooting.

In some embodiments in which there are more than two nodes 32, initial master node 32(a) will send the reboot instruction 74 to all peer nodes 32, while in other embodiments in which there are more than two nodes 32, initial master node 32(*a*) will send the reboot instruction 74 to just one selected initial peer node 32(*b*) at this point.

In step 130, storage software 50 of initial master node 32(*a*) polls 78 the initial peer node 32(*b*) over inter-node communications link 59 periodically (e.g., once every second) until the initial peer node 32(*b*) responds that it has completed rebooting and that it is ready to proceed. In embodiments in which the initial master node 32(*a*) sent reboot instructions 74 to multiple initial peer nodes 32 in step 120, initial master node 32(*a*) polls 78 all of the initial peer nodes 32 in step 130 until the first one responds that it is ready (the first one to respond being referred to as the selected initial peer node 32(*b*)).

In step 140, upon the initial peer node 32(*b*) having responded affirmatively, storage software 50 of initial master node 32(*a*) sends, via inter-node communications link 59, master transition command 80 to the initial peer node 32(*b*) instructing the initial peer node 32(*b*) to become the master (e.g., by initial peer node 32(*b*) setting its local state flag 58(*b*) to Master and loading integral services 56). In some embodiments, in sub-step 145, storage software 50 of initial master node 32(*a*) transitions the integral services 54 from operating on the initial master node 32(*a*) to instead operate on the initial peer node 32(*b*) (e.g., by transferring data regarding any operations currently in the midst of being performed by the integral services 54 on the initial master node 32(*a*) to the integral services 54 that were newly-loaded onto initial peer node 32(*b*)).

Finally, in step 150, storage software 50 of initial master node 32(*a*) reboots the initial master node 32(*a*) into a peer state. This may be accomplished by first setting its local state flag 58(*a*) to Peer and then rebooting. Since step 110 has already been performed, when the initial master node 32(*a*) begins to reboot, it will automatically boot up into the second cryptographic operating mode (e.g., FIPS 140 ON) because of the value of FIPS 140 switch 64. Thus, mode flags 43, 47, and 51 of initial master node 32(*a*) will be set to the first cryptographic operating mode (e.g., FIPS 140 OFF) prior to rebooting but to the second cryptographic operating mode (e.g., FIPS 140 ON) just after rebooting.

FIG. 3 depicts an example method 200 performed by system 30. Method 100 covers similar subject matter as does method 100, but method 200 differs in that it comes from the perspective of the entire system 30. Steps 210, 220, 230, 240, and 250 are performed by the initial master node 32(*a*), while steps 225, 235, and 245 are performed by the initial peer node 32(*b*).

In step 210, upon the storage software 50 of initial master node 32(*a*) receiving, from network interface 60, a user command 70 to toggle the FIPS operating mode of the system 30 (e.g., from FIPS 140 OFF to FIPS 140 ON), storage software 50 of initial master node 32(*a*) toggles (e.g., via toggle command 72) the FIPS 140 software switch stored in the persistent configuration database 64 of the clustered storage system 30 from the first FIPS 140 operating mode (e.g., FIPS 140 OFF) to the second FIPS 140 operating mode (e.g., FIPS 140 ON).

Then, in step 220, storage software 50 of initial master node 32(*a*) sends reboot instruction 74 via inter-node communications link 59 to initial peer node 32(*b*) instructing the initial peer node 32(*b*) to reboot. As mentioned previously, there are two possibilities when system 30 has more than two nodes 32: in some embodiments, storage software 50 of initial master node 32(*a*) sends reboot instruction 74 to one particular initial peer node 32(*b*) in step 220; in other embodiments, storage software 50 of initial master node 32(*a*) sends reboot instructions 74 to all peer nodes 32.

In step 225, in response to step 220, upon receiving the reboot instruction 74 from the initial master node 32(*a*) via inter-node communications link 59, storage software 50 of initial peer node 32(*b*) initiates a reboot into the updated FIPS 140 operating mode defined by the FIPS 140 switch 64 (e.g., FIPS 140 ON). Upon rebooting, the Linux kernel 42, the Linux services 46, and the storage software 50 of initial peer node 32(*b*) all start up with their respective mode flags 43, 47, 51 set to the updated FIPS 140 operating mode as defined by the FIPS 140 switch 64.

In step 230, storage software 50 of initial master node 32(*a*) periodically polls 78 the initial peer node 32(*b*) over inter-node communications link 59 until the initial peer node 32(*b*) indicates that it has rebooted successfully, which storage software 50 of initial peer node 32(*b*) does in step 235, performed in response to step 225. In embodiments in which the initial master node 32(*a*) sent reboot instructions 74 to multiple initial peer nodes 32 in step 220, once the first initial peer node 32(*b*) to successfully reboot responds back to the initial master node 32(*a*), the polling of step 230 may terminate.

Subsequently, in step 240, storage software 50 of initial master node 32(*a*) sends, via inter-node communications link 59, master transition command 80 to the initial peer node 32(*b*) instructing the initial peer node 32(*b*) to transition to a master state that provides the integral services 54 in lieu of the initial master node 32(*a*).

Then, in step 245, storage software 50 of the initial peer node 32(*b*), upon receiving the master transition command 80 from the initial master node 32(*a*) instructing the initial peer node 32(*b*) to transition to the master state in lieu of the initial master node 32(*a*), transitions to the master state that provides the integral services 54 in lieu of the initial master node 32(*a*). Storage software 50 of the initial peer node 32(*b*) does this by setting its local state flag 58(*b*) to Master, and loading the integral services 54. In some embodiments, storage software 50 of the initial peer node 32(*b*) also receives state information via inter-node communications link 59 from the integral services 54 running on the storage software 50 of the initial master node 32(*a*) to allow for a smooth transition.

Then, storage software 50 of the initial master node 32(*a*) reboots into a peer state, the initial master node 32(*a*) being configured to boot into the updated FIPS 140 operating mode defined by the FIPS 140 software switch (e.g., FIPS 140 ON). This may be accomplished by storage software 50 of the initial master node 32(*a*) first setting its local state flag 58(*a*) to Peer and then initiating a reboot. Upon rebooting, the Linux kernel 42, the Linux services 46, and the storage software 50 of initial master node 32(*a*) all start up with their respective mode flags 43, 47, 51 set to the updated FIPS 140 operating mode as defined by the FIPS 140 switch 64.

Finally, in embodiments in which there are multiple peer nodes 32 and the initial master node 32(*a*) sent only a single reboot instruction 74 to one selected initial peer node 32(*b*) in step 220, at this point, storage software 50 of the initial peer node 32(*b*) (which is now operating as a master) sends reboot instructions 74 to all of the remaining peer nodes (except for the initial master node 32(*a*) which is now also operating as a peer).

Thus, techniques have been described for an improved clustered storage system 30 to make use of a software toggle switch 64 stored in a shared persistent configuration database 62, which allows a peer node 32(*b*) to be rebooted into a FIPS 140 mode defined by the switch 64 and then to take over as master while the original master node 32(*a*) reboots into the new FIPS 140 mode as defined by the switch 64. Advantageously, system availability is maintained as the nodes 32 are rebooted sequentially while a master is always available. The persistent switch 64 allows for synchronization, while also allowing persistence of state even in the event of a system crash.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as operating in the context of the FIPS 140 standards, that is by way of example only. Indeed, any cryptographic operating standard may be used, particularly a cryptographic operating standard with an accreditation process such as a government-accreditation process, so long as the general structure of the system and method remains generally as described.

As another example, although various embodiments have been described in the context of switching the system 30 from FIPS 140 OFF mode to FIPS 140 ON mode, this is by way of example only. The same principles apply to switching the system 30 from FIPS 140 ON mode to FIPS 140 OFF mode.

In addition, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of operating a clustered storage system to toggle from a first cryptographic operating mode to a second cryptographic operating mode in a highly-available manner, the method comprising:
   toggling a cryptographic mode software switch stored in a persistent configuration database of the clustered storage system from the first cryptographic operating mode to the second cryptographic operating mode;
   at a first node of the clustered storage system, sending an instruction to a second node instructing the second node to reboot, the second node being configured to boot into a cryptographic operating mode defined by the cryptographic mode software switch, the first node initially being in a master state that provides integral storage services and the second node initially being in a peer state;
   at the first node, polling the second node until the second node indicates that it has rebooted successfully;
   upon the second node having rebooted, sending a command from the first node to the second node, the command instructing the second node to switch to the master state that provides the integral storage services; and
   rebooting the first node into the peer state, the first node being configured to boot into the cryptographic operating mode defined by the cryptographic mode software switch;

wherein:
   the first node, when operating in the second cryptographic operating mode, is validated as using a government-accredited cryptographic module, being configured to only engage in secured communications using cryptographic algorithms that are government-approved;
   the second node, when operating in the second cryptographic operating mode, is validated as using the government-accredited cryptographic module, being configured to only engage in secured communications using cryptographic algorithms that are government-approved;
   the first node, when operating in the first cryptographic operating mode, is configured to engage in secured communications using cryptographic algorithms without regard to government-approval status;
   the second node, when operating in the first cryptographic operating mode, is configured to engage in secured communications using cryptographic algorithms without regard to government-approval status; and
   the government-accredited cryptographic module is a Federal Information Processing Standard (FIPS) 140-accredited cryptographic module.

2. The method of claim 1 wherein the cryptographic mode software switch is configured to be toggleable only by a node of the clustered storage system.

3. The method of claim 1 wherein sending the command from the first node to the second node, the command instructing the second node to switch to the master state that provides the integral storage services, includes transitioning the integral storage services from operating on the first node to instead operate on the second node.

4. A system comprising:
   a persistent configuration database storing a cryptographic mode software switch, the cryptographic mode software switch initially being in an initial state, the initial state defining an initial cryptographic operating mode of the system;
   a first processing node initially in a master state that provides integral storage services, the first processing node operating in the initial cryptographic operating mode defined by the initial state of the cryptographic mode software switch; and
   a second processing node initially in a peer state, the second processing node operating in the initial cryptographic operating mode defined by the initial state of the cryptographic mode software switch;
   wherein the first processing node is configured to:
      upon receiving a user command to toggle the cryptographic operating mode of the system, toggle the cryptographic mode software switch stored in the persistent configuration database from the initial cryptographic operating mode to an updated cryptographic operating mode;
      subsequently, send an instruction to the second processing node instructing the second processing node to reboot;
      poll the second processing node until the second processing node indicates that it has rebooted successfully;

subsequently, send a command to the second processing node instructing the second processing node to transition to the master state that provides the integral storage services in lieu of the first processing node; and subsequently reboot into the peer state, the first processing node being configured to boot into the updated cryptographic operating mode defined by the cryptographic mode software switch; and wherein the second processing node is configured to:

upon receiving the instruction from the first processing node instructing the second processing node to reboot, reboot into the updated cryptographic operating mode defined by the cryptographic mode software switch;

upon rebooting, respond to polling by the first processing node indicating that the second processing node has successfully rebooted; and upon receiving the command from the first processing node instructing the second processing node to transition to the master state in lieu of the first processing node, transition to the master state that provides the integral storage services in lieu of the first processing node;

wherein:

the first processing node, when operating in the first cryptographic operating mode, is validated as using a government-accredited cryptographic module, being configured to only engage in secured communications using cryptographic algorithms that are government-approved;

the second processing node, when operating in the first cryptographic operating mode, is validated as using the government-accredited cryptographic module, being configured to only engage in secured communications using cryptographic algorithms that are government-approved;

the first processing node, when operating in the second cryptographic operating mode, is configured to engage in secured communications using cryptographic algorithms without regard to government-approval status;

the second processing node, when operating in the second cryptographic operating mode, is configured to engage in secured communications using cryptographic algorithms without regard to government-approval status; and the government-accredited cryptographic module is a Federal Information Processing Standard (FIPS) 140-accredited cryptographic module.

5. The system of claim 4 wherein the cryptographic mode software switch is configured to be toggleable only by a processing node of the clustered storage system.

6. An apparatus comprising:

persistent data storage storing a configuration database storing a cryptographic mode software switch, the cryptographic mode software switch initially being in an initial state, the initial state defining an initial cryptographic operating mode of the apparatus;

a first processing node initially in a master state that provides integral storage services, the first processing node operating in the initial cryptographic operating mode defined by the initial state of the cryptographic mode software switch; and a second processing node initially in a peer state, the second processing node operating in the initial cryptographic operating mode defined by the initial state of the cryptographic mode software switch; and networking circuitry configured to connect the first processing node and the second processing node to a network in order to fulfill, from the persistent data storage, data storage requests across the network;

wherein the first processing node is configured to:

upon receiving a user command to toggle the cryptographic operating mode of the system, toggle the cryptographic mode software switch stored in the configuration database from the initial cryptographic operating mode to an updated cryptographic operating mode;

subsequently, send an instruction to the second processing node instructing the second processing node to reboot;

poll the second processing node until the second processing node indicates that it has rebooted successfully;

subsequently, send a command to the second processing node instructing the second processing node to transition to the master state that provides the integral storage services in lieu of the first processing node; and subsequently reboot into the peer state, the first processing node being configured to boot into the updated cryptographic operating mode defined by the cryptographic mode software switch; and wherein the second processing node is configured to:

upon receiving the instruction from the first processing node instructing the second processing node to reboot, reboot into the updated cryptographic operating mode defined by the cryptographic mode software switch;

upon rebooting, respond to polling by the first processing node indicating that the second processing node has successfully rebooted;

upon receiving the command from the first processing node instructing the second processing node to transition to the master state in lieu of the first processing node, transition to the master state that provides the integral storage services in lieu of the first processing node;

wherein:

the first processing node, when operating in the first cryptographic operating mode, is validated as using a government-accredited cryptographic module, being configured to only engage in secured communications using cryptographic algorithms that are government-approved;

the second processing node, when operating in the first cryptographic operating mode, is validated as using the government-accredited cryptographic module, being configured to only engage in secured communications using cryptographic algorithms that are government-approved; and the government-accredited cryptographic module is a Federal Information Processing Standard (FIPS) 140-accredited cryptographic module.

7. The apparatus of claim 6 wherein:

the first processing node, when operating in the first cryptographic operating mode, is validated as using a government-accredited cryptographic module, being configured to only engage in secured communications using cryptographic algorithms that are government-approved;

the second processing node, when operating in the first cryptographic operating mode, is validated as using the government-accredited cryptographic module, being configured to only engage in secured communications using cryptographic algorithms that are government-approved;

the first processing node, when operating in the second cryptographic operating mode, is configured to engage in secured communications using cryptographic algorithms without regard to government-approval status; and the second processing node, when operating in the second cryptographic operating mode, is configured to engage in secured communications using cryptographic algorithms without regard to government-approval status.

8. The apparatus of claim 6 wherein:

the first processing node, when operating in the second cryptographic operating mode, is validated as using a government-accredited cryptographic module, being configured to only engage in secured communications using cryptographic algorithms that are government-approved;

the second processing node, when operating in the second cryptographic operating mode, is validated as using the government-accredited cryptographic module, being configured to only engage in secured communications using cryptographic algorithms that are government-approved;

the first processing node, when operating in the first cryptographic operating mode, is configured to engage in secured communications using cryptographic algorithms without regard to government-approval status; and the second processing node, when operating in the first cryptographic operating mode, is configured to engage in secured communications using cryptographic algorithms without regard to government-approval status.

9. The apparatus of claim 6 wherein the cryptographic mode software switch is configured to be toggleable only by a processing node of the apparatus.

* * * * *